US012632938B2

(12) United States Patent
Zhang et al.

(10) Patent No.: US 12,632,938 B2
(45) Date of Patent: May 19, 2026

(54) IMAGE RESTORATION METHOD AND APPARATUS, IMAGE RESTORATION DEVICE AND STORAGE MEDIUM

(71) Applicant: HEFEI INNOVATION RESEARCH INSTITUTE OF BEIHANG UNIVERSITY, Hefei (CN)

(72) Inventors: Jicong Zhang, Hefei (CN); Hua Wang, Hefei (CN); Jingfei Hu, Hefei (CN); Zhaohui Cao, Hefei (CN); Guang Wu, Hefei (CN)

(73) Assignee: Hefei Innovation Research Institute of Beihang University, Hefei (CN)

( * ) Notice: Subject to any disclaimer, the term of this patent is extended or adjusted under 35 U.S.C. 154(b) by 398 days.

(21) Appl. No.: 18/270,302

(22) PCT Filed: Dec. 29, 2021

(86) PCT No.: PCT/CN2021/142682
§ 371 (c)(1),
(2) Date: Oct. 23, 2023

(87) PCT Pub. No.: WO2022/143812
PCT Pub. Date: Jul. 7, 2022

(65) Prior Publication Data
US 2024/0062343 A1 Feb. 22, 2024

(30) Foreign Application Priority Data
Dec. 29, 2020 (CN) .......................... 202011593292.6

(51) Int. Cl.
*G06T 5/73* (2024.01)
*G06N 3/02* (2006.01)

(52) U.S. Cl.
CPC . *G06T 5/73* (2024.01); *G06N 3/02* (2013.01)

(58) Field of Classification Search
CPC .................................... G06T 5/73; G06N 3/02
(Continued)

(56) References Cited

U.S. PATENT DOCUMENTS

| | | | |
|---|---|---|---|
| 2008/0175508 A1* | 7/2008 | Bando ....................... | G06T 5/73 382/255 |
| 2021/0183020 A1* | 6/2021 | Gollanapalli ........... | G06T 9/002 |
| 2022/0076386 A1* | 3/2022 | Chun ...................... | G06N 3/045 |

OTHER PUBLICATIONS

Shen, Ziyi, et al. "Human-aware motion deblurring." Proceedings of the IEEE/CVF international conference on computer vision. ( Year: 2019).*

(Continued)

*Primary Examiner* — Jennifer Mehmood
*Assistant Examiner* — Eric James Shoemaker
(74) *Attorney, Agent, or Firm* — Reising Ethington, P.C.

(57) ABSTRACT

An image restoration method, apparatus and device, and a storage medium are provided. The method comprises: evaluating, by an unsharpness evaluation network, an image to be processed, to generate an unsharpness feature map: inputting said image to be processed and the unsharpness feature map into a blur elimination main network; and iteratively processing, by the blur elimination main network, the image to be processed for a set number of times according to the unsharpness feature map to output a restored image. In the above-mentioned technical solution, an unsharpness feature of an image to be processed is extracted by using an unsharpness evaluation network, and iterative processing is performed on said image to be processed by using a blur elimination main network, where the networks are trained networks having corresponding functions, such that automatic restoration of an image can be realized, and image restoration efficiency and quality are improved.

10 Claims, 5 Drawing Sheets

(58) Field of Classification Search
 USPC ......................................................... 382/255
 See application file for complete search history.

(56)                         References Cited

OTHER PUBLICATIONS

Shuang Zhang, Ada Zhen, Robert L. Stevenson. GAN Based Image Deblurring Using Dark Channel Prior. https://doi.org/10.48550/arXiv.1903.00107 (Year: 2019).*
Adam Kaufman, Raanan Fattal. Deblurring using Analysis-Synthesis Networks Pair. Computer Vision and Pattern Recognition (CVPR) 2020. https://doi.org/10.48550/arXiv.2004.02956 (Year: 2020).*

* cited by examiner

IMAGE RESTORATION METHOD AND APPARATUS, IMAGE RESTORATION DEVICE AND STORAGE MEDIUM

CROSS REFERENCE TO RELATED APPLICATION

This patent application is a national stage of International Application No. PCT/CN2021/142682, filed on Dec. 29, 2021, which claims the benefit of and priority to Chinese Patent Application No. 2020115932926 filed with China National Intellectual Property Administration on Dec. 29, 2020 and entitled as "IMAGE RESTORATION METHOD AND APPARATUS, IMAGE RESTORATION DEVICE AND STORAGE MEDIUM". Both of the aforementioned applications are incorporated by reference herein in their entireties as part of the present application.

TECHNICAL FIELD

The embodiment of the present disclosure relates to the technical field of image processing, in particular to an image restoration method, an image restoration apparatus, an image restoration device and a storage medium.

BACKGROUND

For the optical imaging system with small depth of field, it is necessary to estimate the defocus amount in the imaging and focusing process, which not only requires a large amount of calculation, but also needs to change the internal parameters of the optical imaging system. Therefore, it is difficult to achieve fast and accurate autofocus. Taking cell culture as an example, there will be a slight deviation of the focal plane with the change of the cell morphology and the medium level, which will lead to the unclear observed image and defocusing blur and will affect the observation results and embryo culture quality. Therefore, it is necessary to restore the blurred image. If the degenerate kernel function of the image is unknown, or the specific defocusing amount or unsharpness cannot be estimated, blind restoration is required. It is difficult to perform blind restoration based on only one blurred image.

The existing methods usually design various prior knowledge based on the minimum mean square error of a fidelity term, and then use convex optimization technology to obtain an approximate restored image by iteration, which has a large amount of calculation and takes a long time. It is difficult to meet the requirements of real-time observation, there is an obvious ringing effect, and the quality of the restored image is poor.

SUMMARY

The present disclosure provides an image restoration method, an image restoration apparatus, an image restoration device and a storage medium, so as to improve the efficiency and quality of image restoration.

In a first aspect, an embodiment of the present disclosure provides an image restoration method, including:

evaluating, by an unsharpness evaluation network, an image to be processed to generate an unsharpness feature map:

inputting the image to be processed and the unsharpness feature map into a blur elimination main network; and iteratively processing, by the blur elimination main network, the image to be processed for a set number of times according to the unsharpness feature map to output a restored image.

Optionally, a middle portion of the unsharpness evaluation network includes a depthwise separable convolution layer: a middle portion of the blur elimination main network is a residual block containing the depthwise separable convolution layer.

Optionally, the blur elimination main network includes an internal circulation structure, the internal circulation structure includes taking an output of a last residual block containing the depthwise separable convolution layer as an input of a first residual block containing the depthwise separable convolution layer.

Optionally, the iteratively processing, by the blur elimination main network, the image to be processed for a set number of times according to the unsharpness feature map to output a restored image includes:

multiplying, by the blur elimination main network, elements of the image to be processed and elements of the unsharpness feature map point by point to obtain a first intermediate feature map:

concatenating the image to be processed, the first intermediate feature map, and an output of a last iteration of the blur elimination main network to obtain a second intermediate feature map:

performing blur elimination processing on the second intermediate feature map, and superimposing the second intermediate feature map with the image to be processed to obtain an output of a current iteration:

repeatedly performing the concatenating, blur elimination processing and superimposing operations until the number of iterations reaches a set number, and outputting the restored image.

Optionally, prior to evaluating, by an unsharpness evaluation network, an image to be processed, the method further includes:

acquiring a sample image, wherein the sample image includes a blurred image and a sharp image:

training the unsharpness evaluation network and the blur elimination main network according to the sample image and an overall loss function.

Optionally, the overall loss function is a linear weighted sum of a first loss function of the unsharpness evaluation network and a second loss function of the blur elimination main network.

Optionally, the first loss function is determined according to a dark channel prior (DCP) or a bright channel prior (BCP):

the second loss function is determined according to structural similarity between an output of each iteration and the sharp image.

In a second aspect, an embodiment of the present disclosure provides an image restoration apparatus, including:

an evaluation module, which is configured to evaluate, by an unsharpness evaluation network, an image to be processed to generate an unsharpness feature map:

an input module, which is configured to input the image to be processed and the unsharpness feature map into a blur elimination main network; and an output module, which is configured to iteratively process, by the blur elimination main network, the image to be processed for a set number of times according to the unsharpness feature map to output a restored image.

In a third aspect, an embodiment of the present disclosure provides an image restoration device, including:

one or more processors:

a memory, in which one or more programs are stored:

when the one or more programs are executed by the one or more processors, the one or more processors implement the image restoration method according to the first aspect.

In a fourth aspect, an embodiment of the present disclosure provides a computer-readable storage medium on which a computer program is stored, wherein the program, when executed by a processor, implements the image restoration method according to the first aspect.

The embodiment of the present disclosure provides an image restoration method, an image restoration apparatus, an image restoration device and a storage medium. The method includes: evaluating, by an unsharpness evaluation network, an image to be processed to generate an unsharpness feature map: inputting the image to be processed and the unsharpness feature map into a blur elimination main network; and iteratively processing, by the blur elimination main network, the image to be processed for a set number of times according to the unsharpness feature map to output a restored image. According to the above technical scheme, the unsharpness evaluation network is used to extract the unsharpness feature of the image to be processed, and the blur elimination main network is used to iteratively process the image to be processed, where the unsharpness evaluation network and the blur elimination main network are trained networks with corresponding functions, which can realize automatic restoration of the image and improve the efficiency and quality of image restoration.

DETAILED DESCRIPTION OF THE EMBODIMENTS

Figure 1:
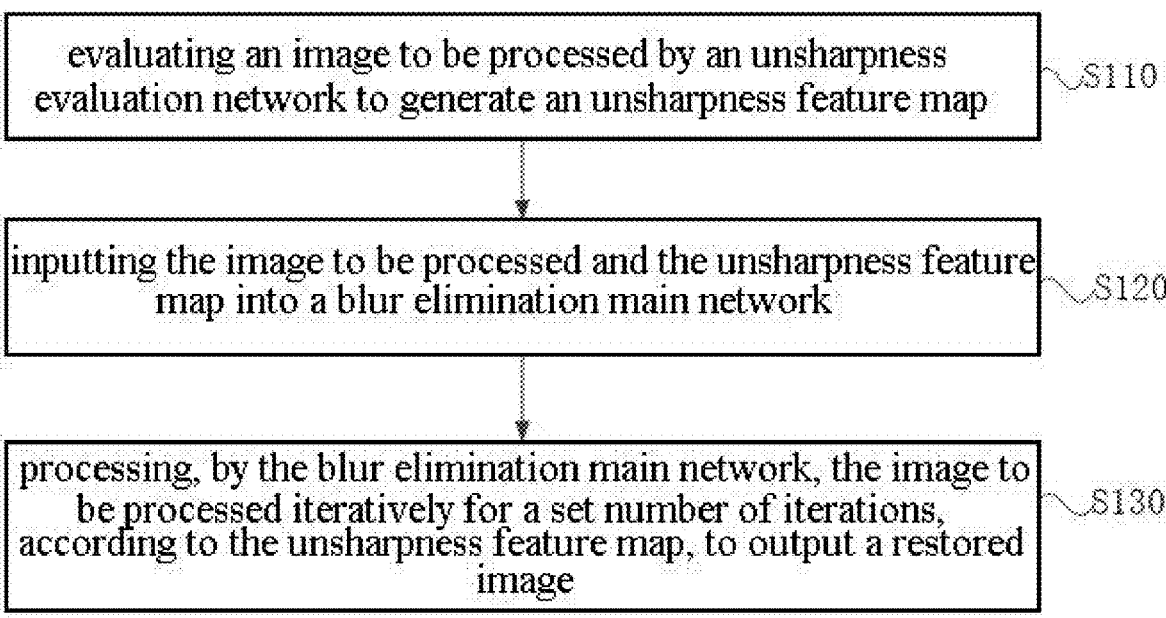
FIG. 1 is a flowchart of an image restoration method according to Embodiment 1 of the present disclosure.

The present disclosure will be further described in detail with the attached drawings and embodiments hereinafter. It can be understood that the specific embodiments described here are only for explaining the present disclosure, rather than limiting the present disclosure. In addition, the embodiments in the present disclosure and the features in the embodiments can be combined with each other without conflict. In addition, it should be noted that, for the convenience of description, only parts related to the present disclosure, but not all structures, are shown in the drawings.

Before discussing the exemplary embodiments in more detail, it should be mentioned that some exemplary embodiments are described as processes or methods depicted as flowcharts. Although the flowchart describes steps as a sequential process, many of the steps can be implemented in parallel, concurrently or simultaneously. In addition, the order of the steps can be rearranged. The processing may be terminated when its operation is completed, but there may be additional steps not included in the drawing. The processes may correspond to methods, functions, procedures, subroutines, subprograms, and the like.

It should be noted that the concepts of "first" and "second" mentioned in the embodiment of the present disclosure are only used to distinguish between different devices, modules, units or other objects, and are not used to limit the order or interdependence of the functions performed by these devices, modules, units or other objects.

In order to better understand the embodiments of the present disclosure, the related technologies are introduced hereinafter.

Embodiment 1

FIG. 1 is a flowchart of an image restoration method according to Embodiment 1 of the present disclosure. This embodiment can be applied to the case of performing image restoration to blurred images. Specifically, the image restoration method can be executed by an image restoration apparatus. The image restoration apparatus can be implemented by software and/or hardware and integrated in the image restoration device. Further, the image restoration device includes but is not limited to: desktop computers, notebook computers, smart phones, servers and other electronic devices.

The image restoration method of this embodiment can be used in a microscopic imaging system. For example, when observing the cell culture process, there will be a slight deviation of the focal plane with the change of the cell morphology and the medium liquid level, which makes the imaging plane not in the focal plane and causes the observed image to be blurred. This phenomenon is referred to as defocus blur. The farther the imaging plane is from the focal plane, the larger the radius of the defocused blur circle is, and the more blurred the observed image is. Restoring defocused blurred images to sharp images belongs to the field of image restoration. Because it is difficult to determine the actual defocus degree, the image restoration for defocused blurred images is blind restoration.

In the image restoration method of this embodiment, a neural network is used to construct an unsharpness evaluation network and a blur elimination main network. After a lot of training, the unsharpness evaluation network and the blur elimination main network learn the features and laws of obtaining a sharp image from a blurred image, and for the input image to be processed, can quickly output the corresponding restored image, thereby supporting a real-time observation of the target, which can be applied to a microscopic imaging system.

As shown in FIG. 1, the method specifically includes the following steps.

S110, evaluating an image to be processed by an unsharpness evaluation network to generate an unsharpness feature map.

Specifically; the image to be processed refers to the blurred image that needs to be restored. Blur can be caused by the defocusing phenomenon in the microscopic imaging system, and can also be caused by the motion, jitter and shooting reasons of the target. The unsharpness evaluation network is used to evaluate the image to be processed, extract the unsharpness features of the image to be processed, and generate an unsharpness feature map. The unsharpness evaluation network is established based on a deep neural network. For example, the head and tail portions of the unsharpness evaluation network include several convolution layers, the convolution kernel size is 3*3, and the number of convolution layers is determined according to the actual demand. For the middle portion the traditional convolution layer can be replaced with a lightweight module, which, for example, consists of several depthwise separable convolution layers, thus reducing the network complexity. The number of the depthwise separable convolution layers is determined according to the actual demand.

Figure 2:
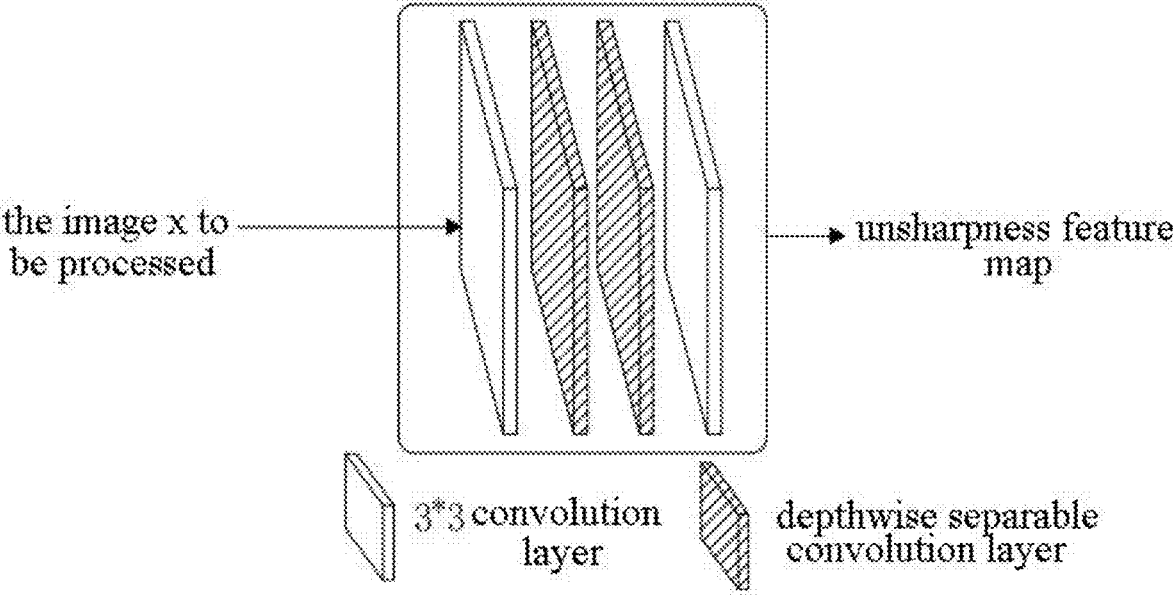
FIG. 2 is a schematic diagram of an unsharpness evaluation network according to Embodiment 1 of the present disclosure.

FIG. 2 is a schematic diagram of an unsharpness evaluation network according to Embodiment 1 of the present disclosure. As shown in FIG. 2, the unsharpness evaluation network consists of two convolution layers with a convolution kernel size of 3*3 at the head and tail and two depthwise separable convolution layers in the middle. The input of the unsharpness evaluation network is the image x to be processed, and the output is the unsharpness feature map. After a lot of training, the unsharpness evaluation network learns how to extract the unsharpness feature of the image to be processed.

The unsharpness evaluation network can also be in other forms, such as a dynamic neural network, an adaptive kernel network and related variant networks, which can dynamically and adaptively evaluate unsharpness features, given a to-be-processed image of any unsharpness, to provide a reliable basis for image restoration.

S120, inputting the image to be processed and the unsharpness feature map into a blur elimination main network.

Specifically, the blur elimination main network is established based on the deep neural network, which is used to iteratively process the image to be processed according to the unsharpness feature map and output the restored image. For example, the head and tail portions of the blur elimination main network include several convolution layers with a convolution kernel size of 3*3, and the number of convolution layers is determined according to the actual demand. In the middle portion, a lightweight module can be used to replace the traditional convolution layer, which, for example, consists of several residual blocks containing the depthwise separable convolution layer, the number of residual blocks determined according to the actual demand, so as to reduce the network parameters and realize the lightweight of the network.

S130, processing, by the blur elimination main network, the image to be processed iteratively for a set number of iterations, according to the unsharpness feature map, to output a restored image.

Specifically, the initial input of the blur elimination main network includes the image to be processed and the unsharpness feature map, and the output is the restored image. For example, the process that the blur elimination main network restores the image to be processed includes: element-wise multiplying the image to be processed and the unsharpness feature map, and in each iteration process, coupling the image to be processed and the feature map after element-wise multiplication with the output of the previous iteration as the output of this iteration process. After a set number of iterations (T), the blurred part in the image to be processed is eliminated, and a sharp restored image can be obtained. In addition, specific functions, such as an exponential function, a sine function or a cosine function, can also be applied during element-wise multiplication.

In this embodiment, the blur elimination main network comprehensively takes into account various information such as the image to be processed, the unsharpness feature map output by the unsharpness evaluation network, and the output of each iteration, and couples these information as the input of each iteration, thus improving the capability of feature reuse.

In an embodiment, the middle portion of the unsharpness evaluation network includes a depthwise separable convolution layer: the middle portion of the blur elimination main network is a residual block containing the depthwise separable convolution layer. In this case, the unsharpness evaluation network and the blur elimination main network are both lightweight networks, and the total number of network parameters does not exceed 7000, which is convenient for training and has better real-time performance.

In an embodiment, the trained unsharpness evaluation network, the blur elimination main network and their network parameters can be embedded in the Image Signal Processor (ISP) of the shooting system, the observation system and the microscopic imaging system, or embedded in a master development board, which can be used to solve the blur problem caused by the inability to focus quickly and accurately, losing no high-frequency information of the image, having no ringing effect, and realizing real-time high-quality observation.

An image restoration method according to Embodiment 1 of the present disclosure generates the unsharpness feature map by the unsharpness evaluation network, performs iterative processing by a blur elimination main network, and reuses the image to be processed, the unsharpness feature map and the features in each iterative process to complete image restoration. This method takes advantage of the powerful nonlinear function mapping capability of deep learning, and by combining with lightweight network design, can realize real-time high-quality image restoration and improve the quality and efficiency of image restoration.

Embodiment 2

Figure 3:
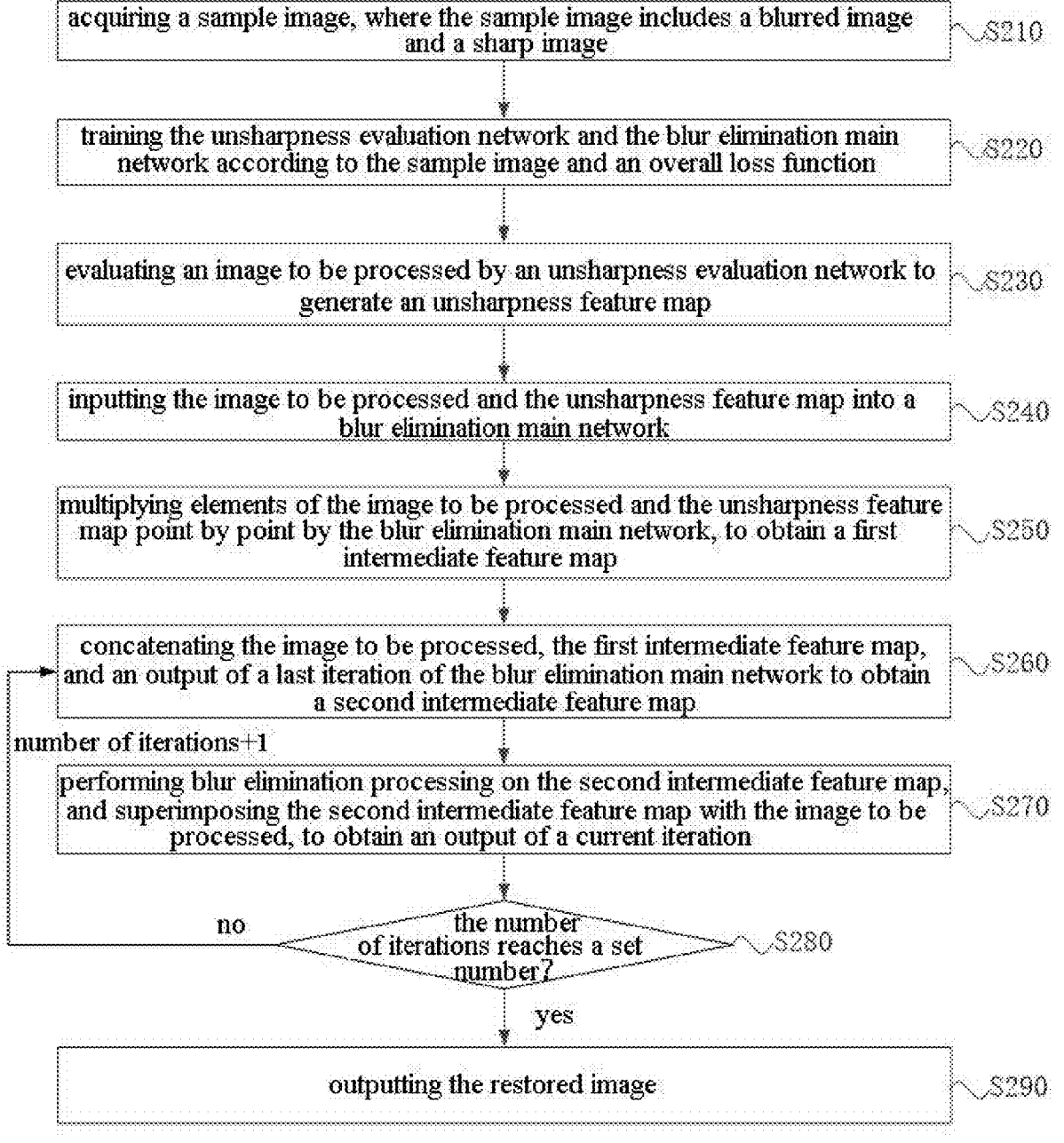
FIG. 3 is a flowchart of an image restoration method according to Embodiment 2 of the present disclosure.

FIG. 3 is a flowchart of an image restoration method according to Embodiment 2 of the present disclosure. This embodiment is optimized on the basis of the above embodiment, and the training process and the iterative processing process of the unsharpness evaluation network and the blur elimination main network are described in detail. It should be noted that for technical details not described in detail in this embodiment, any of the above embodiments may be referred to.

As shown in FIG. 3, the method specifically includes the following steps.

S210, acquiring a sample image, where the sample image includes a blurred image and a sharp image.

Specifically, the sample image is used to train the unsharpness evaluation network and the blur elimination main network, and the sample image is essentially a large number of pairs of blurred images and sharp images. Sample images can be stored locally, downloaded from a server or database, or collected manually according to the imaging system and the shooting system which are selected. In addition, in the case that it is difficult to obtain the real pairs of blurred images and sharp images, the sample image can also be constructed by simulation.

For example, a sample image is acquired by combining a real data set with a simulated data set. For the real data set, a given imaging system or shooting system can be used to capture a sharp image first, and then capture a defocused blurred image by multiple times of fine focusing. The simulated data set can be constructed in the manner of Gaussian kernel simulation. Taking the defocused blur as an example, defocus blur can usually be divided into Gaussian blur or extended Gaussian blur. Convolution operation is performed on the sharp image and Gaussian kernel, and different unsharpness may be simulated by controlling Gaussian kernel size and variance, thereby generating a predetermined number of simulated data sets as sample images.

Figure 4:
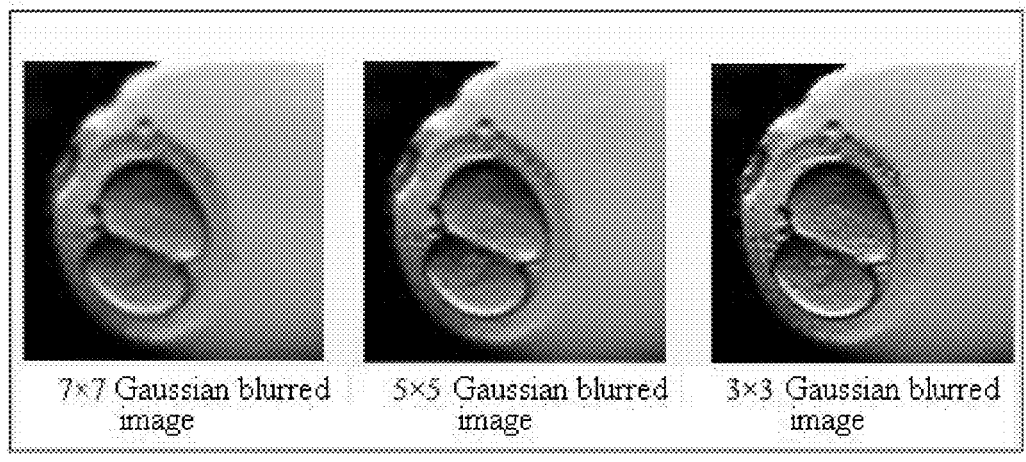
FIG. 4 shows sample images with different Gaussian kernel sizes according to Embodiment 2 of the present disclosure.

FIG. 4 is a schematic diagram of sample images with different Gaussian kernel sizes according to Embodiment 2 of the present disclosure. As shown in FIG. 4, the sizes of the Gaussian kernels are 7*7, 5*5 and 3*3, respectively, in which the image with 7*7 has the most unsharpness and the image with 3*3 is relatively sharp. Convolution is performed for the original sharp image by using different Gaussian kernels, which can obtain three blurred image of different unsharpness, that is, three groups of blurred image and sharp image pairs, all of which can be used as sample images.

S220, training the unsharpness evaluation network and the blur elimination main network according to the sample image and an overall loss function.

Specifically; the unsharpness evaluation network and the blur elimination main network are trained by using the sample image and the overall loss function, so that the unsharpness evaluation network can learn how to extract the unsharpness features of the blurred image, and the blur elimination main network can learn how to iteratively process and restore the blurred image according to the unsharpness feature. When the overall loss function reaches the minimum value or the number of iterations in the training process, the training of the unsharpness evaluation network and the blur elimination main network is completed. The overall loss function can be comprehensively determined according to the first loss function in training unsharpness evaluation network and the second loss function in training blur elimination main network.

During the training process, the hyper-parameters of the network structure are reasonably set, such as the number of cycles R of residual blocks, the set number T of iterations of the blur elimination main network, the number of convolution kernels in each layer of the unsharpness evaluation network and the blur elimination main network, the number of depthwise separable convolution layers, the number of residual blocks containing depthwise separable convolution, etc., The hyper-parameters of the training process, such as the learning rate $\eta$ of gradient descent, the linear weighting coefficients $\lambda_i$ and $\mu$ in the loss function, the number $batch\_size$ of sample images, the number $epoch$ of iterations of the training process, etc., are set reasonably. The best values of the above hyper-parameters can be obtained by cross-validation on the validation set. Based on the above hyper-parameters, the training of the unsharpness evaluation network and the blur elimination main network can be completed on a Graphics Processing Unit (GPU) or a server that can be used to accelerate matrix operation.

Optionally, the unsharpness evaluation network and the blur elimination main network are first pre-trained on the simulated data set, and then the unsharpness evaluation network and the blur elimination main network are finely tuned on the collected real data set.

After a lot of training, the unsharpness evaluation network and the blur elimination main network have the capability of blind restoration, which can be used to restore any blurred image to be processed.

S230, evaluating an image to be processed by an unsharpness evaluation network to generate an unsharpness feature map.

Specifically, the blurred image x to be processed is input, and the function implemented by the unsharpness evaluation network is mapped as $f_{sub}(g)$, and then the unsharpness feature map output by the unsharpness evaluation network is indicated as $f_{sub}(x)$. The resolution of the unsharpness feature map is consistent with the resolution of the image to be processed. It should be noted that the traditional convolution layer is used at the head and tail portions of the unsharpness evaluation network to improve the feature extraction capability, while the depthwise separable convolution layer is used in the middle portion to realize the lightweight of the network and reduce the network parameters.

S240, inputting the image to be processed and the unsharpness feature map into a blur elimination main network.

S250, multiplying elements of the image to be processed and the unsharpness feature map point by point by the blur elimination main network, to obtain a first intermediate feature map.

In this embodiment, in the process of the t-th iteration, the input of the blur elimination main network includes three parts: the image x to be processed, the unsharpness feature map $f_{sub}(x)$ and the output $y^{i-1}$ of the last iteration. First, the blur elimination main network performs point by point multiplication on the elements of the image to be processed and the elements of the unsharpness feature map, that is, element-wise multiplication, to obtain the first intermediate feature map xe $f_{sub}(g)$, which can also be referred to as "a blur attention map".

S260, concatenating the image to be processed, the first intermediate feature map, and an output of a last iteration of the blur elimination main network to obtain a second intermediate feature map.

Specifically, the image x to be processed, the first intermediate feature map xe $f_{sub}(g)$, and the output $y^{i-1}$ of the last iteration are concatenated to obtain a high-dimensional matrix concat $(x, xe\ f_{sub}(g),\ y^{i-1})$, that is, the second intermediate feature map, which is used as the input of the blur elimination main network for this iteration. For the (t=1)-th iteration, the output of the last iteration can be a given value or empty, or set according to the actual demand.

S270, performing blur elimination processing on the second intermediate feature map, and superimposing the second intermediate feature map with the image to be processed, to obtain an output of a current iteration.

Specifically, blur elimination processing is performed on the second intermediate feature map by the blur elimination main network. The process of eliminating blurs includes: if the function implemented by the first convolution layer (the convolution layer with convolution kernel size of 3*3) of the blur elimination main network is mapped as $f_{in}(g)$, the output of the first convolution layer is $f_{in}(concat(x, x\ e\ f_{sub}(g), y^{t-4}))$. The middle portion of the blur elimination main network consists of n residual blocks containing depthwise separable convolution layers (generally n=2), and its implemented function is mapped as $f_{re}$(g), the output of the middle portion is $f_{re}(f_{in}$(concat(x, x e $f_{sub}$(g), $y^{t-1}$))). If the function implemented by the last layer (the convolution layer with convolution kernel size of 3*3) of the blur elimination main network is mapped as $f_{out}$(g), the output of the last layer is. $f_{out}(f_{re}(f_{in}$(concat(x, x e $f_{sub}$(g), $y^{t-1}$)))). On this basis, the image x to be processed is superimposed to obtain the output of the current (t-th) iteration, that is, $y^{t}=f_{out}(f_{re}(f_{in}$(concat(x, x e $f_{sub}$(g), $y^{t-1}$))))+x.

It should be noted that the concatenating operation can be performed by the blur elimination main network, that is, the first layer in the blur elimination main network can be the concatenation layer, followed by the convolution layer and the residual block containing the depthwise separable convolution layer.

S280, determining whether the number of iterations reaches a set number. If the number of iterations reaches the set number, executing S210: if the number of iterations does not reach the set number, adding 1 to the number of iterations, and returning to S206 for the next iteration.

S290, outputting the restored image.

Specifically, when the number of iterations reaches the set number (t=T), the output $y^T$ of the blur elimination main network is taken as the final restored image.

Figure 5:
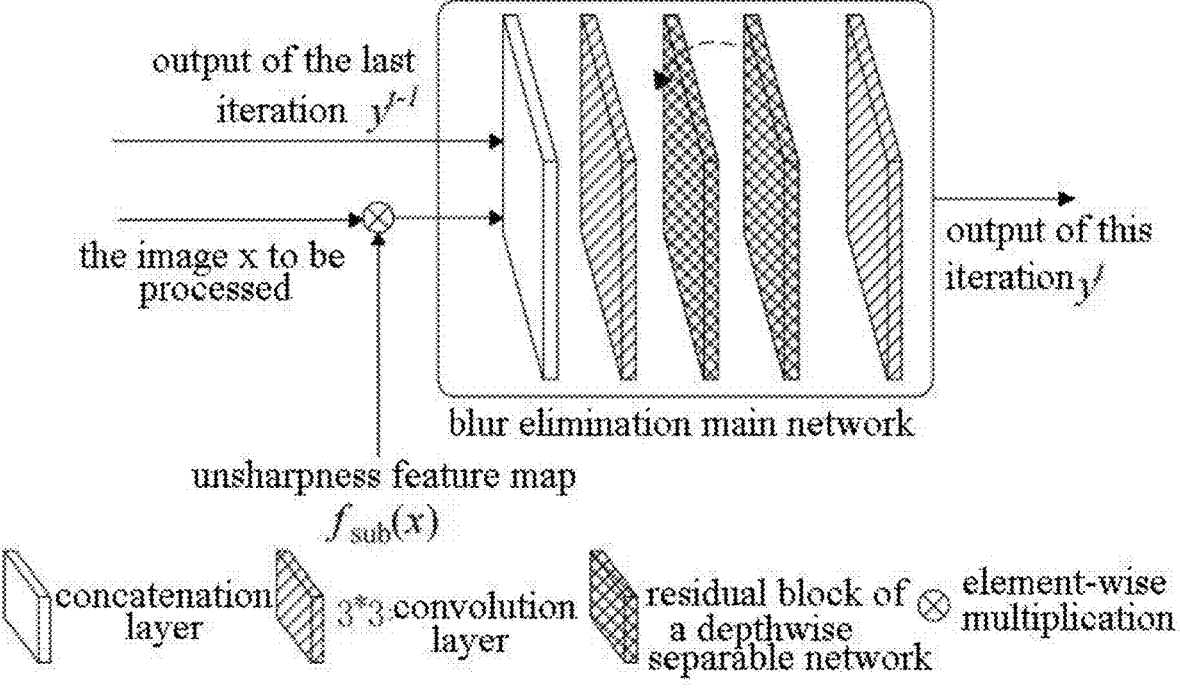
FIG. 5 is a schematic diagram of a blur elimination main network according to Embodiment 2 of the present disclosure.

FIG. 5 is a schematic diagram of a blur elimination main network according to Embodiment 2 of the present disclosure. As shown in FIG. 5, for the t-th iteration, the input of the blur elimination main network includes the image to be processed, the unsharpness feature map and the output of the last iteration. The first layer of the blur elimination main network can be a concatenation layer, which is used to concatenate the output of the three parts. The concatenation layer is followed by a 3*3 convolution layer and then n=2 residual blocks of the depthwise separable convolution layers, and the last layer is still a 3*3 convolution layer.

The image restoration method of this embodiment overcomes the problem of image quality degradation such as defocus blur caused by difficulty in focusing due to uncertain factors, and can adaptively evaluate the unsharpness of the image to be processed and quickly restore a sharp image.

In an embodiment, the overall loss function is the linear weighted sum of the first loss function of the unsharpness evaluation network and the second loss function of the blur elimination main network.

Specifically, if the first loss function of the unsharpness evaluation network is indicated as D, and the second loss function of the blur elimination main network is indicated as L, the overall loss function is Loss=L+μD, where μ is the weighting coefficient, which can be set according to the actual demand.

In an embodiment, the first loss function is determined according to a dark channel prior or a bright channel prior; and the second loss function is determined according to the structural similarity between the output of each iteration and the sharp image.

Specifically, the first loss function of the unsharpness evaluation network can significantly distinguish between the blurred image and the sharp image, and can be determined based on artificial prior knowledge such as the dark channel prior or the bright channel prior. For example, the first loss function is determined according to the dark channel prior. The loss function of the dark channel prior is indicated as $$D(x)(pix) = \min_{p \in N(pix)} ( \min_{c \in \{r,g,b\}} I^c(p)),$$

where pix represents the pixel position, N(pix) represents the image block centered on pix The image block can be a block with base size of 3*3 and 5*5. c $\in \{r, g,b\}$ represents three color channels of the color image, and $I^c(p)$ represents the brightness values under the three color channels.

Figure 6:
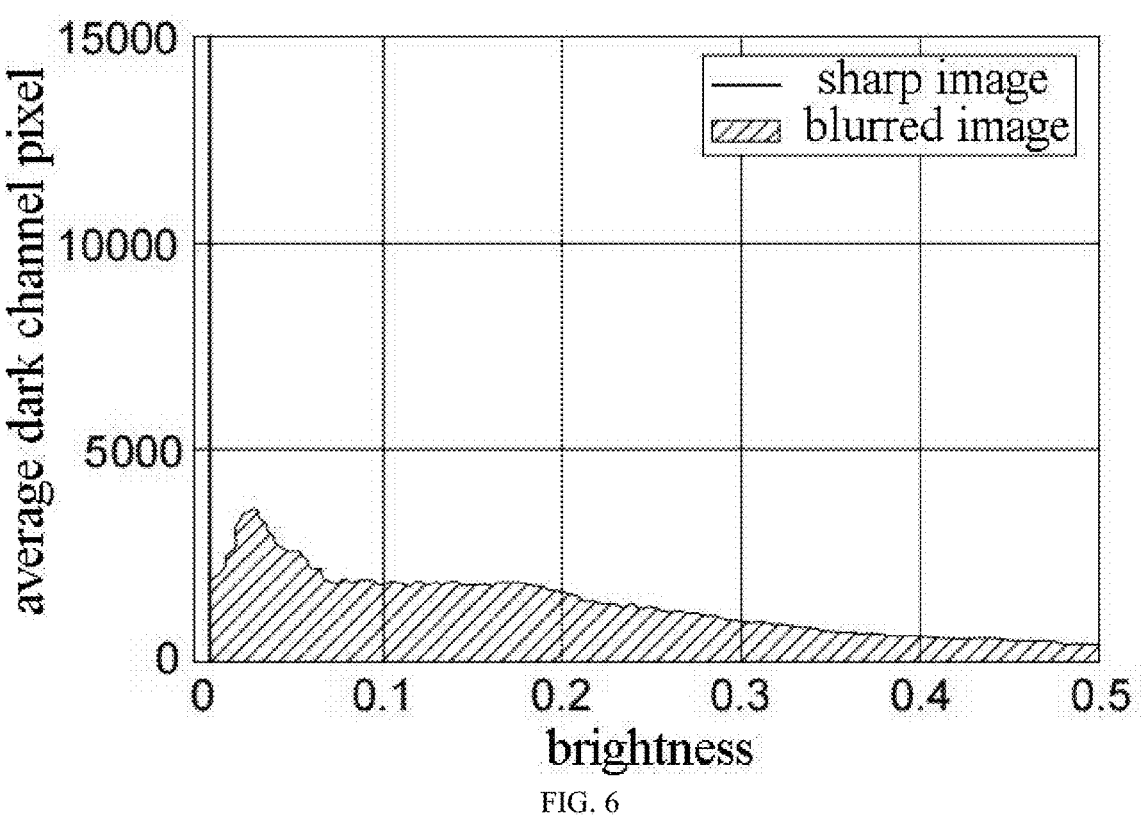
FIG. 6 is a schematic diagram of dark channel prior brightness values of a blurred image and a sharp image according to Embodiment 2 of the present disclosure.

FIG. 6 is a schematic diagram of dark channel prior brightness values of a blurred image and a sharp image according to Embodiment 2 of the present disclosure. As shown in FIG. 6, the value of most pixels in the dark channel of a sharp image is close to 0, while the blurred image is similar to the normal half-side distribution.

The second loss function of the blur elimination main network can be determined based on the Structural Similarity (SSIM) between the output of each iteration and the sharp image. The sharp image is indicated as $x^{GT}$, and the image output from the 1-th iteration is y'. The structural similarity is $l(y^t, x^{GT})=-$SSIM $(y^t, x^{GT})$. A linear weighted sum method can be used to comprehensively evaluate the structural similarity of each iteration, and the second loss function is defined as $$L = \sum_{t=1}^{T} \lambda_t \ell(y^t, x^{GT}),$$

where $\lambda_1$ is the weighted coefficient of the structural similarity of each iteration process.

In an embodiment, the blur elimination main network includes an internal circulation structure, the internal circulation structure includes taking an output of a last residual block containing the depthwise separable convolution layer as an input of a first residual block containing the depthwise separable convolution layer.

Specifically, the blur elimination main network includes two types of circulations: an internal circulation and an external circulation. The internal circulation refers to taking the output of the last residual block in the blur elimination main network as part of the input of the first residual block, and the number of circulations of the internal circulation is R. The external circulation refers to taking the output of the last iteration of the blur elimination main network as part of the input of the current iteration, and the number of circulations of the external circulation is T. By providing two type of circulations, the capability of feature extraction and reuse can be improved, and the image restoration capability of the network can be fully exploited, and further, over-fitting can be avoided while reducing the network parameters and achieving lightweight, improving the quality of image restoration.

Figure 7:
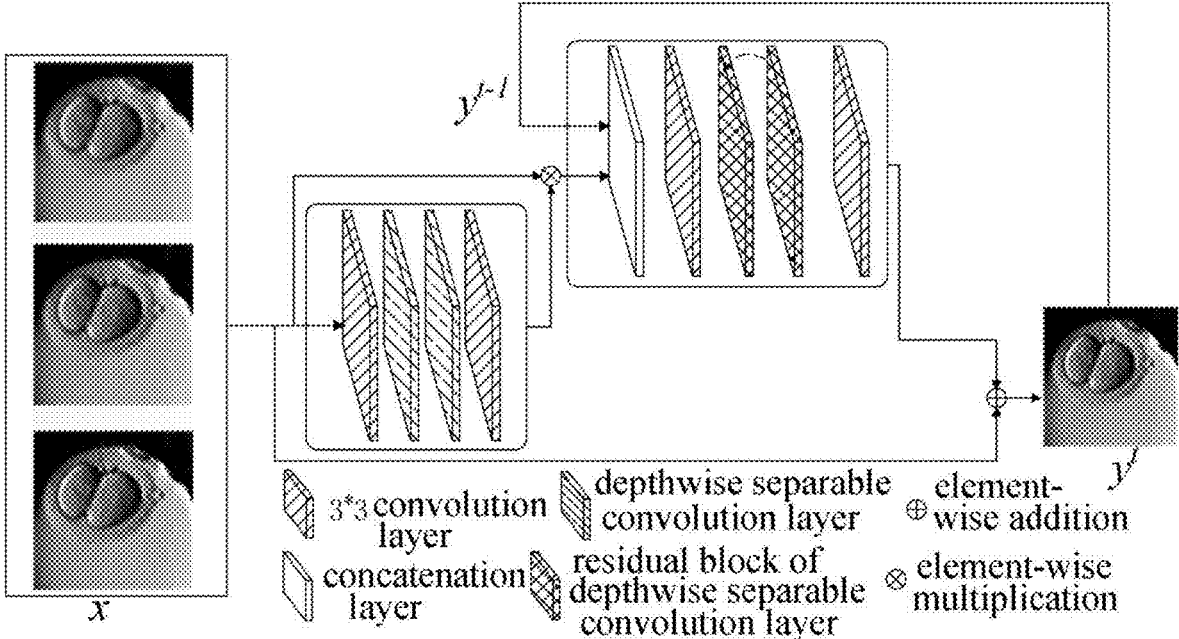
FIG. 7 is a schematic diagram of an image restoration process according to Embodiment 2 of the present disclosure.

FIG. 7 is a schematic diagram of an image restoration process according to Embodiment 2 of the present disclosure. As shown in FIG. 7, the image x to be processed is first input to the unsharpness evaluation network, unsharpness features are extracted by the unsharpness evaluation network to generate an unsharpness feature map: the unsharpness feature map generated by the unsharpness evaluation network, the image to be processed x, and the output $y^{t-1}$ of the last iteration of the blur elimination main network are input into the blur elimination main network, which are concatenated and undergo the blur elimination processing (including element-wise multiplication, convolution, superimposing, an internal circulation, an external circulation, etc.), resulting the output $y^t$ of this iteration. When the number of iterations reaches the set number (t=T), the output is the final restored image $y^T$.

The image restoration method according to Embodiment 2 of the present disclosure is optimized on the basis of the above embodiment, and the sample image is flexibly acquired by combining the real data set and the simulated data set, so as to improve the richness of the sample image. By providing the first loss function, the second loss function and the overall loss function, the blur feature extraction capability of the unsharpness evaluation network, the blur elimination capability of the blur elimination main network and the overall image restoration capability of the two networks are improved. The efficiency and real-time performance of image restoration are improved by using a light-weight module in the middle portion of the unsharpness evaluation network and the blur elimination main network, and the convolution layer is used in the head and tail portion to ensure the feature extraction capability. By coupling a variety of information as the input of the blur elimination main network, and providing the internal circulation and the external circulation for the blur elimination main network, the capability of feature extraction and reuse is improved, and the image restoration capability of the network is fully exploited. In addition, over-fitting can be avoided while reducing the network parameters and achieving lightweight, improving the quality of image restoration.

Embodiment 3

Figure 8:
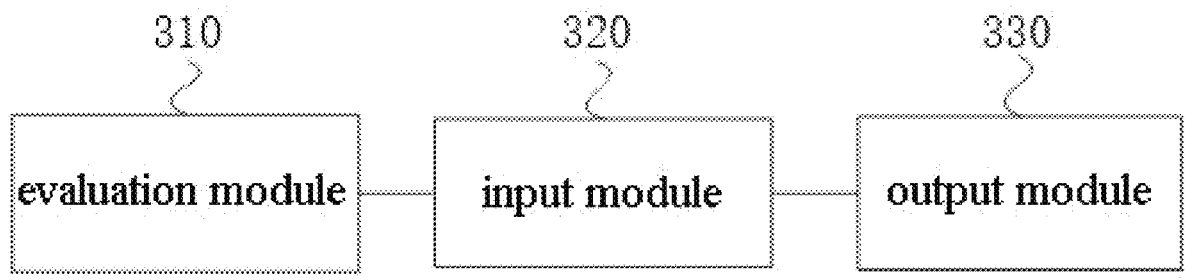
FIG. 8 is a schematic structural diagram of an image restoration apparatus according to Embodiment 3 of the present disclosure.

FIG. 8 is a schematic structural diagram of an image restoration apparatus according to Embodiment 3 of the present disclosure. As shown in FIG. 8, the image restoration apparatus according to this embodiment includes:

an evaluation module 310, which is configured to evaluate, by an unsharpness evaluation network, an image to be processed to generate an unsharpness feature map:

an input module 320, which is configured to input the image to be processed and the unsharpness feature map into a blur elimination main network; and an output module 330, which is configured to iteratively process, by the blur elimination main network, the image to be processed for a set number of times according to the unsharpness feature map to output a restored image.

An image restoration apparatus according to Embodiment 3 of the present disclosure extracts the unsharpness features of the image to be processed through the evaluation module, and iteratively processes the image to be processed through the output module. The unsharpness evaluation network and the blur elimination main network used are trained existing networks with corresponding functions, which can realize the automatic restoration of the image and improve the efficiency and quality of image restoration.

On the basis of the above embodiment, the middle portion of the unsharpness evaluation network includes the depth-wise separable convolution layer: the middle portion of the blur elimination main network is a residual block containing the depthwise separable convolution layer.

On the basis of the above embodiment, the blur elimination main network includes an internal circulation structure, the internal circulation structure includes taking an output of a last residual block containing the depthwise separable convolution layer as an input of a first residual block containing the depthwise separable convolution layer.

On the basis of the above embodiment, the output module 330 includes:

a multiplication unit, which is configured to multiply, by the blur elimination main network, elements of the image to be processed and elements of the unsharpness feature map point by point to obtain a first intermediate feature map:

a convolution unit, which is configured to concatenate the image to be processed, the first intermediate feature map, and an output of a last iteration of the blur elimination main network to obtain a second intermediate feature map:

a superimposing unit, which is configured to perform blur elimination processing on the second intermediate feature map, and superimpose the second intermediate feature map with the image to be processed to obtain an output of a current iteration:

The concatenation, blur elimination processing and superimposing operations are repeatedly performed, until the number of iterations reaches a set number, and the restored image is output.

On the basis of the above embodiment, the apparatus further includes:

an acquisition module, which is configured to acquire the sample image prior to evaluating, by the unsharpness evaluation network, the image to be processed, wherein the sample image includes the blurred image and the sharp image:

a training module, which is configured to train the unsharpness evaluation network and the blur elimination main network according to the sample image and the overall loss function.

On the basis of the above embodiment, the overall loss function is a linear weighted sum of a first loss function of the unsharpness evaluation network and a second loss function of the blur elimination main network.

On the basis of the above embodiment, the first loss function is determined according to a dark channel prior or a bright channel prior:

the second loss function is determined according to the structural similarity between the output of each iteration and the sharp image.

The image restoration apparatus provided in Embodiment 3 of the present disclosure can be used to execute the image restoration method provided in any of the above embodiments, and has corresponding functions and beneficial effects.

Embodiment 4

Figure 9:
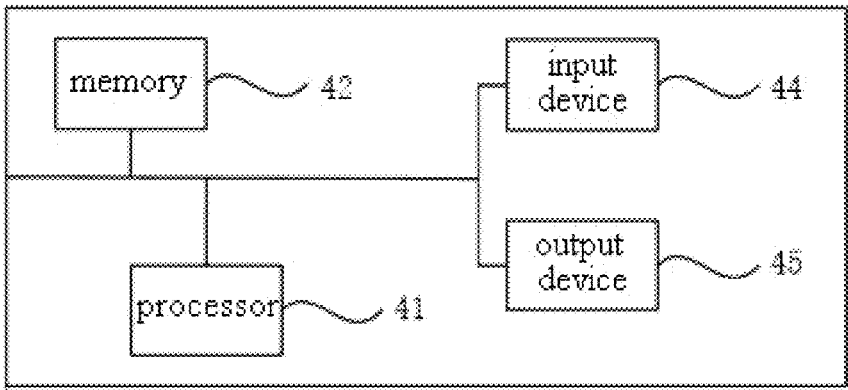
FIG. 9 is a schematic diagram of a hardware structure of an image restoration device according to Embodiment 4 of the present disclosure.

FIG. 9 is a schematic diagram of a hardware structure of an image restoration device according to Embodiment 4 of the present disclosure. The image restoration device includes, but is not limited to, desktop computers, notebook computers, smart phones, servers and other electronic devices. As shown in FIG. 9, the image restoration device provided by the present application includes a memory 42, a processor 41 and a computer program stored in the memory and executable on the processor, and the above image restoration method is implemented when executing the program by the processor 41.

The image restoration device may further include a memory 42. There may be one or more processor(s) 41 in the image restoration device, and one processor 41 is taken as an example in FIG. 9. The memory 42 is configured to store one or more programs. The one or more programs are executed by the one or more processors 41, so that the one or more processor(s) 41 implement the image restoration method as described in the embodiment of the present application.

The image restoration device further includes an input apparatus 44 and an output apparatus 45.

The processor 41, the memory 42, the input apparatus 44, and the output apparatus 45 in the image restoration device can be connected by a bus or other means. In FIG. 9, connection by a bus is taken as an example.

The input apparatus 44 can be used to receive input digital or character information and generate key signal input related to user settings and function control of the image restoration device. The output apparatus 45 may include a display device such as a display screen.

As a computer-readable storage medium, the memory 42 can be configured to store software programs, computer-executable programs and modules, such as program instructions/modules corresponding to the image restoration method described in the embodiment of the present application (for example, the evaluation module 310, the input module 320 and the output module 330 in the image restoration device). The memory 42 may include a storage program area and a storage data area, wherein the storage program area may store an operating system and an application program required by at least one function. The storage data area may store data created according to the use of the image restoration device and the like. In addition, the memory 42 may include a high-speed random access memory, and may also include a nonvolatile memory, such as at least one disk memory device, a flash memory device, or other nonvolatile solid-state memory devices. In some examples, the memory 42 may further include memories remotely located with respect to the processor 41, and these remote memories may be connected to the image restoration device through a network. Examples of the above networks include, but are not limited to, the Internet, an intranet, a local area network, a mobile communication network, and combinations thereof.

On the basis of the above embodiments, this embodiment further provides a computer-readable storage medium, on which a computer program is stored, which, when executed by an image restoration apparatus, implements the image restoration method in any of the above embodiments of the present disclosure. The method includes: evaluating, by an unsharpness evaluation network, an image to be processed to generate an unsharpness feature map: inputting the image to be processed and the unsharpness feature map into a blur elimination main network; and iteratively processing, by the blur elimination main network, the image to be processed for a set number of times according to the unsharpness feature map to output a restored image.

For the storage medium containing computer-executable instructions according to an embodiment of the present disclosure, any combination of one or more computer-readable media can be adopted. The computer-readable medium may be a computer-readable signal medium or a computer-readable storage medium. The computer-readable storage medium can be, for example, but not limited to: an electrical, magnetic, optical, electromagnetic, infrared, or semiconductor system, apparatus or device, or any combination of the above. More specific examples (a non-exhaustive list) of computer-readable storage media include: an electrical connection with one or more wires, a portable computer diskette, a hard disk, a Random Access Memory (RAM), a Read Only Memory (ROM), an Erasable Programmable Read Only Memory (EPROM), a flash memory, an optical fiber, a portable CD-ROM, an optical storage device, a magnetic storage device, or any suitable combination of the above. The computer-readable storage medium can be any tangible medium containing or storing a program, which can be used by or in combination with an instruction execution system, apparatus or device.

The computer-readable signal medium may include a data signal propagated in a baseband or as part of a carrier wave, in which the computer-readable program code is carried. The propagated data signal can take many forms, including but not limited to electromagnetic signals, optical signals or any suitable combination of the above. The computer-readable signal medium can also be any computer-readable medium other than the computer-readable storage medium, which can send, propagate or transmit the program for use by or in connection with the instruction execution system, apparatus or device.

The program code contained in the computer-readable medium can be transmitted by any suitable medium, including but not limited to: wireless, wire, optical cable, Radio Frequency (RF), etc., or any suitable combination of the above.

The computer program codes for performing the operations of the present application can be written in one or more programming languages or the combination thereof. The programming languages include object-oriented programming languages such as Java, Smalltalk and C++, as well as conventional procedural programming languages such as "C" or similar programming languages. The program code can be completely executed on the user computer, partially executed on the user computer, executed as an independent software package, partially executed on the user computer, partially executed on a remote computer, or completely executed on a remote computer or server. In the case of a remote computer, the remote computer can be connected to a user computer through any type of networks, including a Local Area Network (LAN) or a Wide Area Network (WAN), or can be connected to an external computer (for example, through the Internet using an Internet service provider).

From the above description of the embodiments, those skilled in the art can clearly understand that the present disclosure can be implemented by software and necessary general hardware. Of course, the present disclosure can also be implemented by hardware. However, in many cases, the former is preferable. Based on this understanding, the technical scheme of the present disclosure can be embodied in the form of software products in essence or in the part that contributes to the prior art. The computer software product can be stored in a computer-readable storage medium, such as a computer floppy disk, a Read-Only Memory (ROM), a Random Access Memory (RAM), a FLASH, a hard disk or an optical disk, etc., including several instructions to make a computer device (which can be a personal computer, a server, or a network device, etc.) execute the image restoration method according to various embodiments of the present disclosure.

It should be noted that the above is only the preferred embodiment of the present disclosure and the applied technical principles. Those skilled in the art will understand that the present disclosure is not limited to the specific embodiments described herein. Various obvious changes, readjustments and substitutions can be made to those skilled in the art without departing from the scope of protection of the present disclosure. Therefore, although the present disclosure has been described in detail through the above embodiments, the present disclosure is not limited to the above embodiments, but includes more other equivalent embodiments without departing from the concept of the present disclosure, and the scope of the present disclosure is determined by the scope of the appended claims.

What is claimed is:

1. An image restoration method, comprising:
   evaluating, by an unsharpness evaluation network, an image to be processed to generate an unsharpness feature map:
   inputting the image to be processed and the unsharpness feature map into a blur elimination main network; and iteratively processing, by the blur elimination main network, the image to be processed for a set number of times according to the unsharpness feature map to output a restored image;

wherein a middle portion of the unsharpness evaluation network comprises a depthwise separable convolution layer;

a middle portion of the blur elimination main network is a residual block containing the depthwise separable convolution layer:

wherein the blur elimination main network comprises an internal circulation structure, the internal circulation structure comprises taking an output of a last residual block containing the depthwise separable convolution layer as an input of a first residual block containing the depthwise separable convolution layer:

wherein the iteratively processing, by the blur elimination main network, the image to be processed for a set number of times according to the unsharpness feature map to output a restored image comprises:

multiplying, by the blur elimination main network, elements of the image to be processed and elements of the unsharpness feature map point by point to obtain a first intermediate feature map;

concatenating the image to be processed, the first intermediate feature map, and an output of a last iteration of the blur elimination main network to obtain a second intermediate feature map; wherein for a first iteration, an output of the last iteration of the blur elimination main network is a predetermined value or null;

performing blur elimination processing on the second intermediate feature map, and superimposing the second intermediate feature map with the image to be processed to obtain an output of a current iteration;

repeatedly performing the concatenating, blur elimination processing and superimposing operations until a number of iterations reaches a set number, and outputting the restored image.

2. The method according to claim 1, prior to evaluating, by an unsharpness evaluation network, an image to be processed, further comprising:

acquiring a sample image, wherein the sample image comprises a blurred image and a sharp image:

training the unsharpness evaluation network and the blur elimination main network according to the sample image and an overall loss function.

3. The method according to claim 2, wherein the overall loss function is a linear weighted sum of a first loss function of the unsharpness evaluation network and a second loss function of the blur elimination main network.

4. The method according to claim 3, wherein the first loss function is determined according to a dark channel prior or a bright channel prior:

the second loss function is determined according to structural similarity between an output of each iteration and the sharp image.

5. An image restoration device, comprising:

one or more processors:

a memory, in which one or more programs are stored:

wherein when the one or more programs are executed by the one or more processors, the one or more processors implement an image restoration method, which comprises:

evaluating, by an unsharpness evaluation network, an image to be processed to generate an unsharpness feature map;

inputting the image to be processed and the unsharpness feature map into a blur elimination main network; and iteratively processing, by the blur elimination main network, the image to be processed for a set number of times according to the unsharpness feature map to output a restored image;

wherein a middle portion of the unsharpness evaluation network comprises a depthwise separable convolution layer:

a middle portion of the blur elimination main network is a residual block containing the depthwise separable convolution layer:

wherein the blur elimination main network comprises an internal circulation structure, the internal circulation structure comprises taking an output of a last residual block containing the depthwise separable convolution layer as an input of a first residual block containing the depthwise separable convolution layer:

wherein the iteratively processing, by the blur elimination main network, the image to be processed for a set number of times according to the unsharpness feature map to output a restored image comprises:

multiplying, by the blur elimination main network, elements of the image to be processed and elements of the unsharpness feature map point by point to obtain a first intermediate feature map;

concatenating the image to be processed, the first intermediate feature map, and an output of a last iteration of the blur elimination main network to obtain a second intermediate feature map; wherein for a first iteration, an output of the last iteration of the blur elimination main network is a predetermined value or null:

performing blur elimination processing on the second intermediate feature map, and superimposing the second intermediate feature map with the image to be processed to obtain an output of a current iteration:

repeatedly performing the concatenating, blur elimination processing and superimposing operations until a number of iterations reaches a set number, and outputting the restored image.

6. A non-transitory computer-readable storage medium on which a computer program is stored, wherein the program, when executed by a processor, implements following steps:

evaluating, by an unsharpness evaluation network, an image to be processed to generate an unsharpness feature map;

inputting the image to be processed and the unsharpness feature map into a blur elimination main network; and iteratively processing, by the blur elimination main network, the image to be processed for a set number of times according to the unsharpness feature map to output a restored image:

wherein a middle portion of the unsharpness evaluation network comprises a depthwise separable convolution layer:

a middle portion of the blur elimination main network is a residual block containing the depthwise separable convolution layer:

wherein the blur elimination main network comprises an internal circulation structure, the internal circulation structure comprises taking an output of a last residual block containing the depthwise separable convolution layer as an input of a first residual block containing the depthwise separable convolution layer;

wherein the iteratively processing, by the blur elimination main network, the image to be processed for a set number of times according to the unsharpness feature map to output a restored image comprises:

multiplying, by the blur elimination main network, elements of the image to be processed and elements of the unsharpness feature map point by point to obtain a first intermediate feature map;

concatenating the image to be processed, the first intermediate feature map, and an output of a last iteration of the blur elimination main network to obtain a second intermediate feature map; wherein for a first iteration, an output of the last iteration of the blur elimination main network is a predetermined value or null;

performing blur elimination processing on the second intermediate feature map, and superimposing the second intermediate feature map with the image to be processed to obtain an output of a current iteration;

repeatedly performing the concatenating, blur elimination processing and superimposing operations until a number of iterations reaches a set number, and outputting the restored image.

7. The image restoration device according to claim 5, prior to evaluating, by an unsharpness evaluation network, an image to be processed, further comprising:

acquiring a sample image, wherein the sample image comprises a blurred image and a sharp image:

training the unsharpness evaluation network and the blur elimination main network according to the sample image and an overall loss function.

8. The image restoration device according to claim 7, wherein the overall loss function is a linear weighted sum of a first loss function of the unsharpness evaluation network and a second loss function of the blur elimination main network.

9. The image restoration device according to claim 8, wherein the first loss function is determined according to a dark channel prior or a bright channel prior;

the second loss function is determined according to structural similarity between an output of each iteration and the sharp image.

10. The non-transitory computer-readable storage medium according to claim 6, prior to evaluating, by an unsharpness evaluation network, an image to be processed, further comprising:

acquiring a sample image, wherein the sample image comprises a blurred image and a sharp image;

training the unsharpness evaluation network and the blur elimination main network according to the sample image and an overall loss function.

* * * * *